Figure 1:
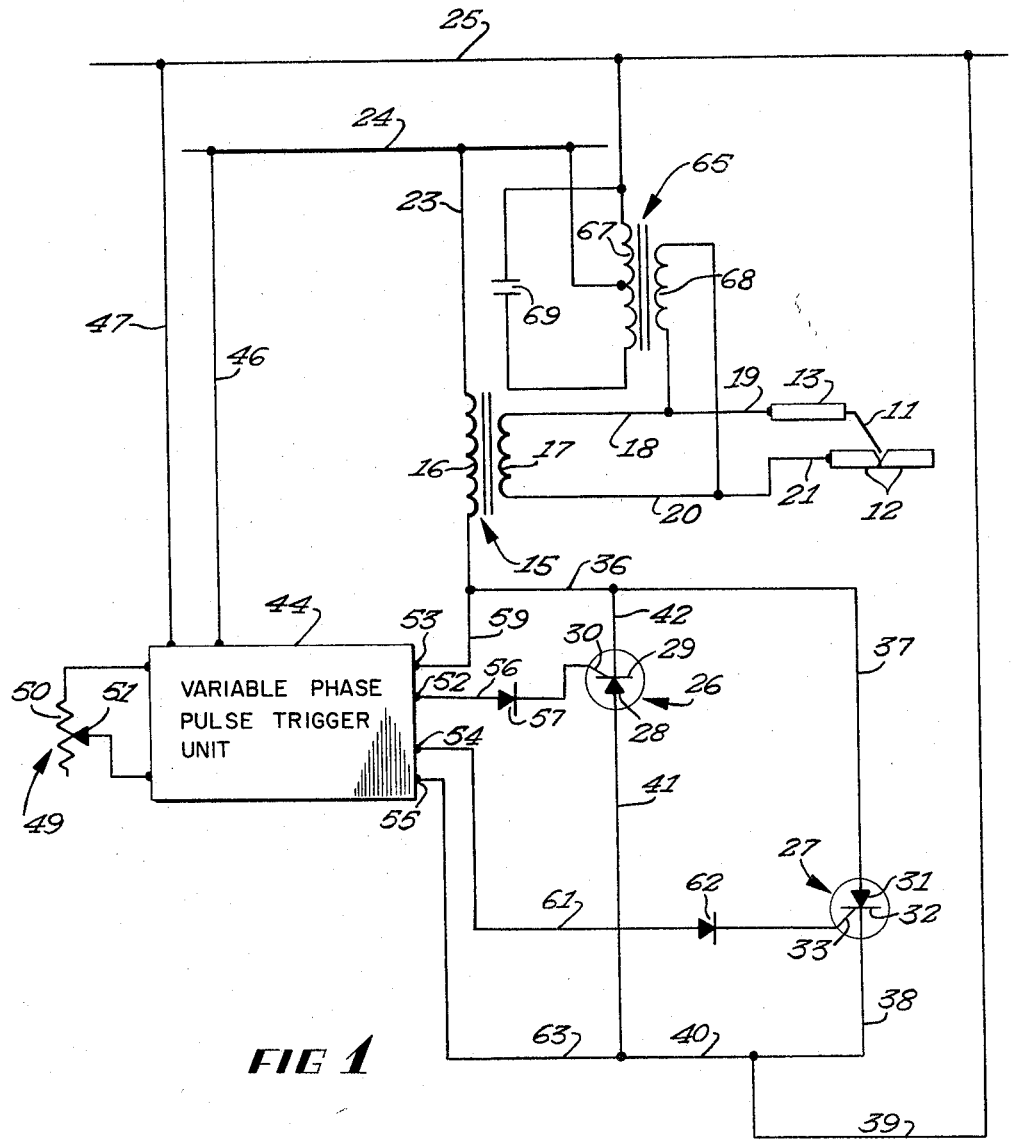

Nov. 8, 1966

F. J. HAJICEK 3,284,666

VARIABLE WELD CURRENT APPARATUS HAVING
AUXILIARY ARC ESTABLISHING MEANS

Filed May 4, 1964

2 Sheets-Sheet 1

INVENTOR.
FRANK J. HAJICEK
BY
Frederick E. Lange
ATTORNEY

INVENTOR.
FRANK J. HAJICEK
BY Frederick E. Lange
ATTORNEY

United States Patent Office 3,284,666
Patented Nov. 8, 1966

3,284,666
VARIABLE WELD CURRENT APPARATUS HAVING AUXILIARY ARC ESTABLISHING MEANS
Frank J. Hajicek, St. Paul, Minn., assignor to Marquette Corporation, Minneapolis, Minn., a corporation of Delaware
Filed May 4, 1964, Ser. No. 364,554
7 Claims. (Cl. 315—174)

The present invention pertains to a welding control apparatus and more particularly to a welding control apparatus of the type using alternating or other cyclically varying voltage in which means are provided for varying the amount of welding current.

In connection with welding apparatus of the type using a cyclically varying voltage, certain problems arise in connection with controlling the amount of welding current flowing through the welding arc. Various means have been used in the prior art for the control of this current, but each system imposes substantial and varying degrees of restriction on current control, operator mobility, and remote control feasibilities. A control system which does not impose these great restrictions can best be accomplished by controlling the portion of each voltage cycle of the power supply during which current flows to the welding electrode. One method for doing this is to employ rectifiers having control elements and which have the property of remaining conductive once a voltage is applied to the control element sufficient to cause it to become conductive. The control is then exercised by controlling the phase of the control voltage for the control element so as to cause the rectifier to initiate conduction at various points in the voltage cycle. A typical control system of that type is shown in the copending application of Willis H. Gille and Ralph I. Anderson, Serial No. 364,625, filed of even date herewith.

A system of this type works very well providing that the range of control is not such that for low welding currents, the point at which a voltage is first applied to the control element of the rectifier is so late in the voltage cycle that the voltage at that time is insufficient to initially break down the welding gap. Under these conditions, the welding arc is never established and no welding current flows. As a result, where apparatus of this type has been employed, it is necessary to place a lower limit upon the extent to which the welding current can be adjusted so that the initiation of the conductive cycle always occurs at a point on the voltage curve sufficiently early that the voltage is still high enough to break down the welding gap.

An object of the present invention is to provide means in such a system for extending the possible range of the adjustment so that the very low welding currents can be obtained where desired.

It is thus an object of the invention to provide in alternating current welding apparatus having means for adjusting the portion of the cycle during which welding current flows, means to enable very low welding currents to be provided for.

Very briefly, this is accomplished in my invention by providing a supplemental connection between the power supply and the welding electrode which is independent of the adjustable control means for the main welding current and which is capable of maintaining on the welding electrode a voltage sufficiently high to cause establishment of the welding arc so that regardless of where the adjustable means is set, it is assured that welding current will flow during each half cycle.

In one form, I accomplish this by providing an auxiliary transformer of relatively low current capacity which is capable of applying across the welding gap a voltage sufficiently high to break down the welding gap.

In another form, I provide a supplemental inductive connection to the welding means for supplying welding current, which connection is independent of the adjustable control means.

It is also an object of the present invention to provide for power factor correction in such welding control apparatus.

Figure 2:
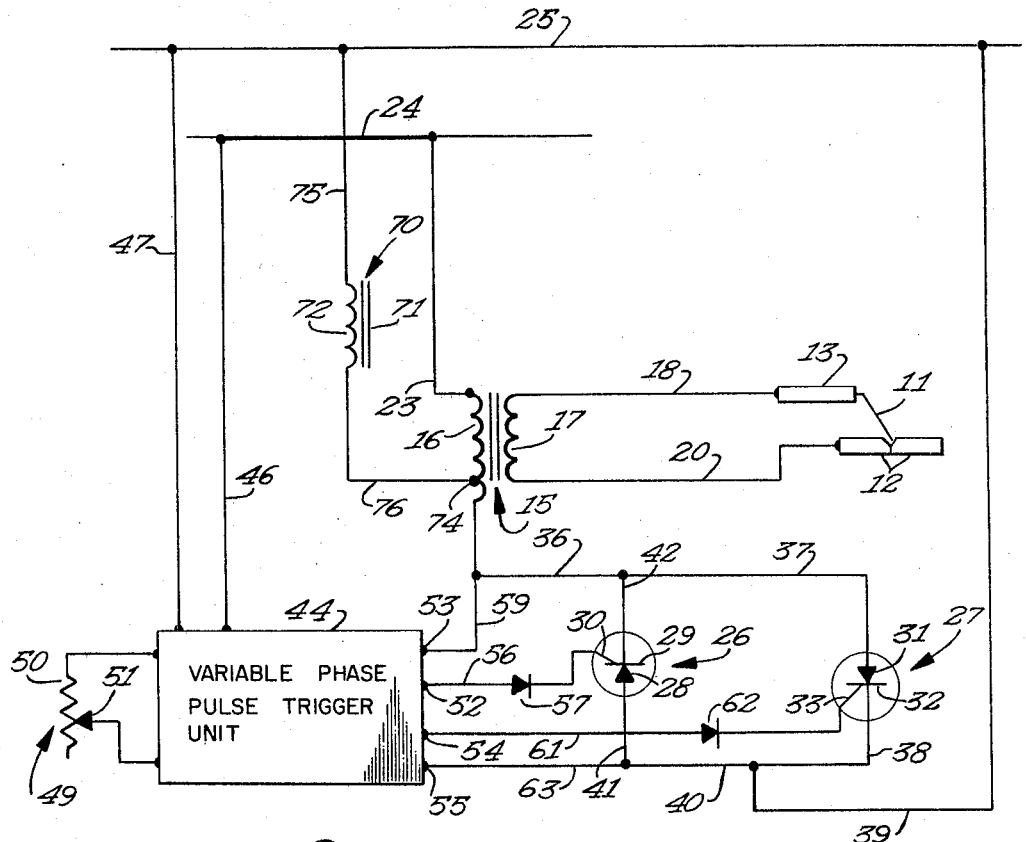
Figure 3:
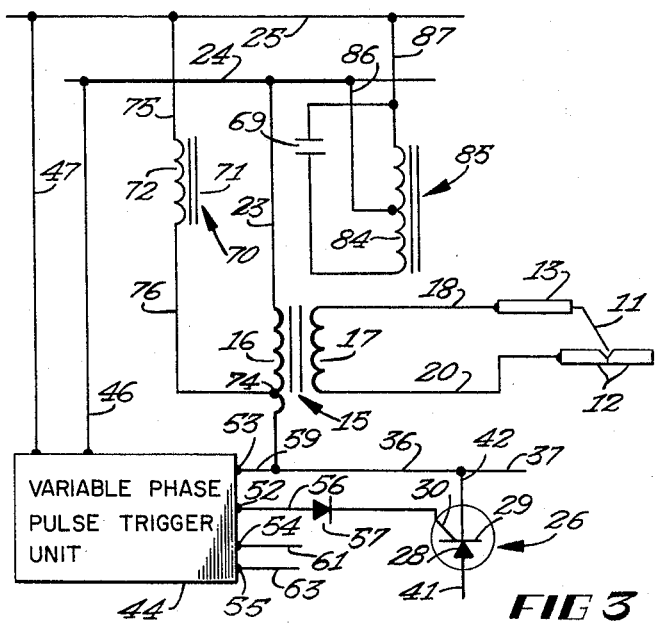

Other objects of the invention will be apparent from a consideration of the accompanying specification and drawing of which:

FIGURE 1 shows schematically one form of my improved welding control apparatus,
FIGURE 2 shows schematically a modification of my welding control apparatus, and
FIGURE 3 shows a portion of a further modification of my invention.

Referring to FIGURE 1 of the drawing, I have shown a welding electrode 11 which is adapted to be associated with two pieces of metal 12 which are to be welded together and which constitute the work pieces. The welding electrode 11 is supported in a suitable handle 13. Power is supplied to the welding electrode 11 by a transformer 15 having a primary winding 16 and a secondary winding 17. The welding transformer 15 is a step down transformer for supplying a relatively low voltage, high amperage current to the welding electrode. In a typical case, the current may be as high as 300 amperes. The upper terminal of secondary winding 17 is connected by conductors 18 and 19 to the electrode 11. The lower terminal is connected by conductors 20 and 21 to the work pieces 12. The primary winding 16 has its upper terminal connected through conductor 23 to a line conductor 24 which with another line conductor 25 is connected to a suitable source of power. The lower terminal of primary winding 16 is connected to the other line conductor 25 through two silicon controlled rectifiers 26 and 27. These silicon controlled rectifiers are of conventional form and in one particular example may be of the type commercially known as 71RC50A rectifiers. A silicon controlled rectifier is commonly referred to as an SCR and in the following specification will be so referred to. The SCR 26 comprises an anode 28, a cathode 29 and a gate electrode 30. The SCR 27 similarly comprises an anode 31, a cathode 32 and a gate electrode 33. Each of the SCR's 26 and 27 have the property that they do not become conductive until a positive voltage of a predetermined magnitude is applied between the gate electrode and the cathode. As soon as this voltage is applied, the SCR becomes conductive and remains conductive as long as the anode is positive with respect to the cathode. Once the SCR becomes conductive, the gate electrode has no further control over the conduction of the SCR.

In order to control such SCR's, it has been proposed that the phase of the voltage applied to the gate electrode be varied so that the SCR becomes conductive at various points in the voltage cycle. By thus varying the extent of the voltage cycle during which the SCR is conductive, it is possible to control the amount of current flowing through the SCR.

While technically a complete cycle of an alternating current consists of two half cycles in one of which the instantaneous voltage is positive and in the other of which the instantaneous voltage is negative, it is possible to regard each half cycle as a "cycle." Since it is contemplated that the present invention could be utilized with a rectified source of current in which there would be a series of cycles of the same polarity, each of the same length as a half cycle of the alternating current from which the rectified current is derived, the term cycle as used hereinafter will mean that portion of the voltage wave which periodically repeats whether in the positive or negative sense. Thus in the case of an alternating current, I am using the term "cycle" to designate the portion of the current or voltage wave which is often referred to as a half cycle.

Turning back for a moment to the connections of the SCR's 26 and 27 to the primary transformer 16, it will be noted that a path can be traced during one cycle from the lower terminal of secondary 16 through conductors 36 and 37, the anode 31 and conductors 38 and 39 back to the line conductor 25. Similarly, during the next cycle, in which the instant polarity of the voltage source is opposite to that of the previous cycle, a circuit may be traced through conductors 39, 40 and 41, the anode and cathode of SCR 26 and conductors 42 and 36 to the primary winding 16. Thus, during alternate cycles, if both SCR's 26 and 27 are conductive, current flows through the primary winding 16 for a length of time dependent upon the portion of the cycles during which SCR's 26 and 27 are conductive. I have shown in block form a variable phase pulse triggering unit 44. This unit may take any of various forms of well known apparatus for providing voltage pulses to the gate electrode 30 and 33 of SCR's 26 and 27, which voltage pulses are varied in phase depending upon the length of time that it is desired to have the SCR's conductive. A very desirable form of such pulse trigger unit is that shown in the co-pending application of Willis H. Gille and Ralph I. Anderson referred to above and this is the pulse trigger unit which I contemplate using. This trigger unit has power supplied to it by connections 46 and 47 extending to the line conductors 24 and 25. The phase position of the pulses is controlled by a rheostat 49 having a resistor 50 and a slider 51 associated with the resistor 50. This rheostat is connected to the pulse trigger unit and varies the phase position of the pulses in accordance with the setting of the slider 51 on the resistor 50. The pulse trigger unit produces a series of pulses which are alternately of opposite polarity and are applied to the gate electrodes 30 and 33. These pulses are produced in every other cycle between terminals 52 and 53 and in the alternate cycles between terminals 54 and 55. Terminal 52 is connected to gate electrode 30 through a conductor 56 and a rectifier 57. The rectifier 57 is provided to prevent any negative voltage from being applied to the gate electrode 30. The terminal 53 is connected through conductors 59, 36 and 42 to the cathode 29. Thus, the positive pulses appearing between terminals 52 and 53 are applied between the gate electrode 30 and the cathode 29. Similarly, terminal 54 is connected through a conductor 61 and a rectifier 62 to the gate electrode 33 and terminal 55 through conductors 63, 40 and 38 to the cathode 32. The rectifier 62 is provided for the same purpose as rectifier 57, namely, to insure that only positive voltage pulses are applied to the gate electrode 33.

The apparatus dscribed so far has already been previously proposed. It will be obvious from the foregoing description that as the rheostat 49 is varied, the phase position of the pulses supplied to gate electrodes 30 and 33 will shift to cause the SCR's 26 and 27 to become conductive during varying portions of the cycle.

This apparatus functions satisfactorily providing that the control does not have a range of adjustment such that the SCR's 26 or 27 are not made conductive so late in the voltage cycle that the voltage applied to the welding electrode is insufficient to break down the gap between it and the work pieces 12. As will be appreciated, a substantially greater voltage is required to initially break down this gap and establish the welding arc than is required to maintain the arc once it has been established. My invention is designed to be used with equipment of this type in which rheostat 49 has a wide enough range of adjustment to permit the condition just discussed to occur were it not for the apparatus presently to be described.

The numeral 65 designates a second transformer having a relatively small current carrying capacity. This transformer is preferably of the leakage type since its secondary is effectively short circuited as soon as the arc is established. The transformer 65 comprises primary winding 67 and a low voltage secondary winding 68. The low voltage secondary winding 68 is connected between conductors 18 and 20 leading from the secondary winding 17 to the welding electrode 11 and the work pieces 12. The primary winding 67 has an upper and a lower portion, the upper portion being the main primary winding and being connected to line conductors 24 and 25. A condenser 69 is connected across the entire primary winding including both the upper and lower portions. The purpose of this condenser and its inclusion with the transformer 65 will presently be described.

It will be noted that the transformer 65 is connected between the power source and the welding electrodes independently of the variable phase pulse trigger unit 44 and independently of the SCR's 26 and 27. This transformer is capable of supplying only a limited amount of current, for example, 30 amperes, but the open circuit voltage of secondary 68 is substantially the same as and in phase with that of secondary 17. In actual practice, it has been found desirable to make the open circuit voltage of secondary 68 slightly higher than that of secondary 17. This is due to the fact that the secondary winding 17 is connected across secondary 68 so that regardless of whether the rectifiers 26 and 27 are conducting, there is some current drain on secondary 68 through secondary 17. Since transformer 66 is of the leakage type, this results in some drop in its voltage output and in order to insure that its voltage output is always at least equal to the voltage output of secondary 17, it is accordingly desirable to make the open circuit voltage of secondary 68 somewhat higher than that of secondary 17. Thus, the open circuit voltage of secondary 68 is always sufficiently high to cause an arc to appear between the electrode 11 and the workpieces 12.

It will be obvious from the foregoing description that the effect of transformer 65 is to always insure that the welding arc will be established. Even when the rheostat 49 is set so as to provide for an initiation of the conductive cycle of SCR's 26 and 27 relatively late in the voltage cycle, the welding arc will occur because of the fact that prior to this time, the voltage supplied by transformer 65 has been effective to establish this arc. Because of the relatively low value of the current supplied by transformer 65, for example, 30 amperes, as compared with 300 amperes which it is possible to supply by transformer 15, the existence of this relatively small current supplied by transformer 65 does not seriously affect the lower limit of welding current. In fact, the current which is possible with the present arrangement is very much smaller than that which is possible were it not for the transformer 65 and the apparatus of my invention.

Reference has been made to the condenser 69. This condenser is connected across the complete primary winding 67 which has a voltage appearing across it which is approximately twice that of the line voltage due to autotransformer effect. The condenser 69 introduces into the system a power factor correction to partially compensate for the inductive effect introduced by transformers 15 and 65. The reason for employing the relatively high voltage across condenser 69 is to reduce the size of the condenser necessary. It is well known that where it is desired to introduce a capacitive effect, a small capacitor can be employed if it is connected across a relatively high voltage secondary, the primary of which is connected into the circuit involved. The purpose of including the power factor correction provision in transformer 65 instead of the transformer 15 is one of economics since it requires less wire to wind the additional turns in the lower half of the primary winding on a smaller core such as provided by transformer 65.

It will be seen that with the arrangement of FIGURE 1, it is possible greatly to extend the range of adjustment of welding current that is possible in a system where the variation in welding current is obtained by varying the portion of the voltage cycle during which voltage is applied to the welding electrode.

In FIGURE 2, I have shown a modification in which similar results are obtained without the use of the auxiliary transformer 65. Since many of the elements in FIGURE 2 are the same as in FIGURE 1, it is not necessary to completely redescribe the entire system of FIGURE 1. Where the elements are the same as in FIGURE 1, the same reference numerals are used in FIGURE 2 to designate these elements as were used in FIGURE 1 in connection with the same elements.

Turning to the specific disclosure of FIGURE 2, I have provided an inductance unit 70 having a core 71 and a winding 72. The winding 72 of the inductance unit 70 is connected between line conductor 25 and an intermediate tap 74 on primary 16 through conductors 75 and 76. It will thus be noted that the portion of the primary winding 16 between the tap 74 and the upper terminal of primary 16 is connected directly between line conductors 24 and 25 in the following circuit: from line conductor 24 through conductor 23, the upper portion of primary winding 16 to tap 74, conductor 76, inductance winding 72 and conductor 75, to the other line conductor 25. It will thus be seen that the portion of primary winding 16 above the tap 74 is energized through inductor 70 independently of the SCR's 26 and 27 so that regardless of the point in the voltage cycles at which these SCR's become conductive, a voltage is always induced in the secondary winding 17 to produce a welding arc between the electrode 11 and the work pieces 12. The alternating current impedance of inductor 70 is substantially negligible until a current flows through secondary 17 as a result of the establishment of the welding arc. Furthermore, because the lower terminal of winding 72 of inductor 70 is connected to an intermediate tap 74, the supplemental connection to primary winding 16 provided by inductor 70 connects the full line voltage across only a portion of the primary winding 16. The result is that the voltage across secondary 17 is somewhat higher than the voltage occurring when SCR's 26 and 27 are fully conductive. In this way, a relatively high open circuit voltage appears between electrode 11 and the work pieces 12. At the same time, the supplemental connection provided to primary 16 by inductor 70 limits the amount of current that flows as a result of this supplemental connection, since when current starts flowing through secondary 17 and the welding arc, the impedance offered by the inductor 70 rises substantially to limit the current flow as a result of inductor 70 to a relatively small value.

Turning to the operation of this modification, it will be seen that regardless of where the slider 51 of the rheostat 49 is set, it will always be possible to have sufficient voltage between the electrode 11 and the work pieces 12 to insure that an arc is established during each cycle. Because of the fact that the current flow possible as a result of the connection of the primary winding through inductor 70 is limited in value because of the impedance offered by inductor 70 to the flow of an alternating or pulsating current therethrough, it is still possible by adjustment of rheostat 49 to produce relatively low welding currents. In other words, even though the connection through inductor 70 provides for an even larger open circuit voltage between electrode 11 and work pieces 12 than is provided by the SCR's 26 and 27, the amount of current resulting from this supplemental connection to primary 16 is sufficiently limited that the minimum value of welding current which can be obtained is still very low. In fact, because of the difficulties pointed out above where a supplemental source of voltage is not provided, it is possible with this arrangement, just as with the arrangement of FIGURE 1, to have a much wider range of adjustment than would otherwise be possible.

In the arrangement of FIGURE 1, a power factor correction condenser was connected across all of the turns of primary winding 67 of the auxiliary transformer 65. Since with the present modification, the auxiliary transformer is not employed, I have omitted, in the arrangement of FIGURE 2, the power factor correction which is desirable but not necessary. Where, however, power factor correction is considered to be of importance, the modification of FIGURE 3 may be employed. In this figure, which omits part of the complete circuit for simplicity of description, I have again employed the same reference characters to designate elements similar to those used in FIGURE 2. In this modification, the power factor correction condenser 69 is connected across the entire winding 84 of an autotransformer 85. The upper half of the winding of the autotransformer is connected between line conductors 24 and 25 by conductors 86 and 87. The condenser 69 is connected across the entire winding 84. It will be understood that inasmuch as the winding 84 is connected only across condenser 69, it is possible to use a winding having relatively smaller wire than is necessary to use in, for example, the welding transformer 15.

It will be obvious that the condenser 69 has the same effect in FIGURE 3 as it did in connection with FIGURE 1, namely, it acts to correct the power factor to compensate for the change introduced by the presence of the inductance of transformer 15. The arrangement of FIGURE 3, while it employs an additional autotransformer 85 has the advantage that it does not adversely affect the operation of the main welding transformer 15 such as would be the case if the condenser 69 were associated with that transformer.

It will be seen that with all of the modifications of my arrangement, it is possible to have a very wide range of adjustment of the welding current in a system where the variation in welding current is primarily obtained by varying the portions of the voltage cycles during which voltage is applied to the welding electrode. It will also be seen that in all of these embodiments of my invention, I have accomplished this by a relatively simple apparatus.

While I have shown certain specific embodiments of my invention, it is to be understood that this is for purposes of illustration only and that my invention is limited only by the scope of the appended claims.

What is claimed is:

1. In welding apparatus, electrode means to provide a welding arc, power supply means adapted to be connected to a source of cyclically varying voltage for supplying a cyclically varying current to said electrode means, control means for said power supply means effective to vary the portion of each cycle of the voltage of said source during which current is supplied to said electrode means to vary the current flowing in said welding arc, and an auxiliary power supply means for applying to said electrode means independently of said control means a voltage sufficiently high to cause initial establishment of the welding arc so that regardless of the setting of said control means, a welding arc will be established during each cycle.

2. In welding apparatus, electrode means to provide a welding arc, power supply means adapted to be connected to a source of cyclically varying power for supplying a cyclically varying current to said electrode means, control means for said power supply means effective to vary the portion of each cycle of the voltage of said source during which current is supplied to said electrode means to vary the current flowing in said welding arc, said control means having a range of adjustment sufficiently great that when said control means is adjusted to provide a relatively low welding current, the point in the voltage cycle at which current flow is to be initiated is so late in the cycle that the voltage is insufficient to initially establish the welding arc, and an auxiliary power supply means for applying to said electrode means independently of said control means a voltage sufficiently high to cause initial establishment of the welding arc so that regardless of the setting of said control means, a welding arc will be established during each cycle.

3. In welding apparatus, electrode means to provide a welding arc, a first transformer having a very high current capacity, said transformer having a primary winding adapted to be connected to a source of alternating current power and a secondary winding connected to said electrode means, control means for said first transformer connected to one of said windings and effective to vary the portion of each cycle of the voltage of said source during which current is supplied by said transformer to said electrode means to vary the current flowing in said transformer and in said welding arc, said control means having a range of adjustment sufficiently great that when said control means is adjusted to provide for a relatively low current being supplied by said transformer to the electrode means, the point in the voltage cycle at which current flow is to be initiated is so late in the cycle that the voltage is insufficient to initially establish the welding arc, and a second transformer of relatively low current capacity connected between the source of power and the electrode means independently of said control means to apply to said electrode means a voltage sufficiently high to cause initial establishment of the welding arc so that regardless of the setting of said control means, a welding arc will be established during each cycle.

4. The welding apparatus of claim 3 in which a capacitor is connected to the primary winding of said second transformer for the purpose of at least partially correcting the power factor for the inductive effect of said first and second transformer.

5. In welding apparatus, electrode means to provide a welding arc, power supply means adapted to be connected to a source of cylically varying voltage for supplying a cyclically varying current to said electrode means, rectifier means connected to said power supply means for controlling the current flowing to said electrode means, said rectifier means having control element means and effective when a predetermined voltage is applied to said control element means to become conductive and to remain conductive as long as a voltage of the correct polarity is applied across said rectifier means regardless of the subsequent voltage applied to said control element means; adjustable phase control means for applying to said control element means a control voltage whose phase is adjustable in accordance with the desired welding current to vary the portion of each cycle of the voltage of said source during which said rectifier means allows current to flow in said welding arc, said phase control means having a range of adjustment sufficiently great that when said control means is adjusted to provide a relatively low welding current, the point in the voltage cycle at which current flow is to be initiated is so late in the cycle that the voltage is insufficient to initially establish the welding arc in that cycle, and an auxiliary means for applying to said electrode means independently of said control means a voltage sufficiently high to cause initial establishment of the welding arc so that regardless of the setting of said control means, a welding arc will be established during each cycle.

6. The welding apparatus of claim 1 in which the auxiliary power supply means is a means including an impedance device for connecting the power supply means to the source of power independently of the control means.

7. In welding apparatus, electrode means to provide a welding arc, welding transformer having a primary winding connected to a source of alternating current power and a secondary winding connected to said electrode means, control means for said first transformer connected to said primary winding and effective to vary the portion of each cycle of the voltage of said source during which current is supplied by said transformer to said electrode means to vary the current flowing in said transformer and in said welding arc, said control means having a range of adjustment sufficiently great that when said control means is adjusted to provide for a relatively low current being supplied by said transformer to the electrode means, the point in the voltage cycle at which current flow is to be initiated is so late in the cycle that the voltage is insufficient to initially establish the welding arc, and an impedance device connecting said primary winding to said source of power independently of said control means to apply to said electrode means a voltage sufficiently high to cause initial establishment of the welding arc so that regardless of the setting of said control means, a welding arc will be established during each cycle.

No references cited.

JAMES W. LAWRENCE, *Primary Examiner.*

S. A. SCHNEEBERGER, *Assistant Examiner.*